UNITED STATES PATENT OFFICE.

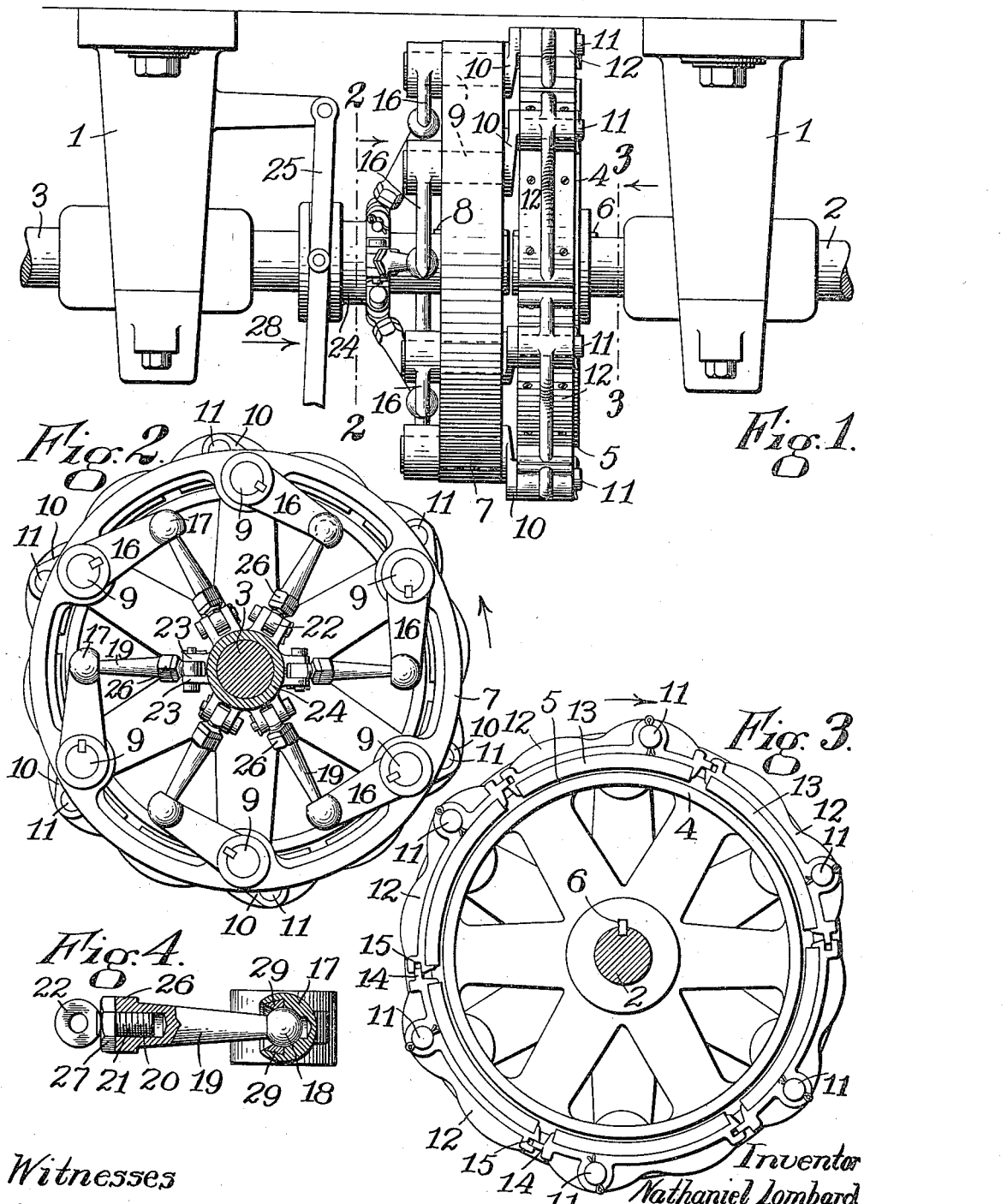

NATHANIEL LOMBARD, OF WORCESTER, MASSACHUSETTS, ASSIGNOR TO HOLYOKE MACHINE COMPANY, OF WORCESTER, MASSACHUSETTS, A CORPORATION OF MASSACHUSETTS.

FRICTION-CLUTCH.

1,153,635.      Specification of Letters Patent.     Patented Sept. 14, 1915.

Application filed May 18, 1912. Serial No. 698,179.

*To all whom it may concern:*

Be it known that I, NATHANIEL LOMBARD, a citizen of the United States, residing at Worcester, in the county of Worcester and Commonwealth of Massachusetts, have invented a new and useful Improvement in Friction-Clutches, of which the following is a specification, accompanied by drawings forming a part of the same.

My invention relates to a friction clutch which comprises a series of friction blocks concentrically arranged around the axis of a drum provided with a peripheral friction surface.

The objects of my invention are to increase the efficiency of this type of clutches, render its construction more simple and to provide means for its adjustment to compensate for wear.

These objects, among others, I accomplish by the construction and arrangement of parts as hereinafter described and set forth in the accompanying claims.

Referring to the accompanying drawings, Figure 1 represents a front elevation of my improved clutch applied to rotating shafts. Fig. 2 is a side view shown in section on the plane of the broken line 2—2, Fig. 1. Fig. 3 is a side view showing the side opposite to that shown in Fig. 2, the shaft supporting one of the members of the clutch being shown in sectional view on the plane of the broken line 3—3, Fig. 1. Fig. 4 is a detail view of one of the thrust links, partly shown in section to illustrate the means for adjustment.

Similar reference characters refer to similar parts in the different views.

In the accompanying drawings I have shown my improved clutching mechanism as employed to communicate the rotary motion of one shaft to another in alinement therewith. Referring to Fig. 1, 1, 1 denote a pair of hangers forming a part of the supporting mechanism in which the shafts are journaled. One of the shafts is represented at 2 and the second shaft at 3. In the construction shown I assume shaft 2 to be a rotating shaft whose motion is communicated to the shaft 3 by means of a clutching mechanism embodying my present invention. To the shaft 2 I attach a drum 4 having its periphery provided with a friction surface 5 concentric with the axis of the shaft 2. This drum is attached to the end of the shaft 2 by means of a key 6, or other suitable means. In alinement with the shaft 2 is the shaft 3 and to the end of the shaft 3 I attach a cylindrical frame 7 by means of a key 8, or other suitable means.

In the rim of the frame 7 I journal a series of short shafts 9. Preferably integral with one end of each of the shafts 9 is an arm 10 carrying in its free end a spindle 11 overhanging the drum 4. Journaled on the spindles 11 are blocks 12 which are preferably provided with facings 13 of wood, or other suitable friction material, which are curved concentrically with the friction surface of the drum 4. The blocks 12 are flexibly interlocked at their opposing ends by means of a tongue 14 on one end of each block, entering a groove 15 in the opposing end of the adjacent block.

As shown in Fig. 3, each friction block 12 is hung from its spindle 11 near one end of the block, rather than at the center thereof. The result of this arrangement is as follows:—With the clutch in disengaged position, the movement of the short end of any block toward the drum 4 is accompanied by a much greater movement of the long end thereof away from the drum. Since the said long end is interlocked with the short end of the next adjacent block, it follows that a movement of this amplitude is not possible. On the other hand if the blocks were hung from their centers, this tendency to multiply the movement of the block is not present; consequently there would be no hindrance to the rocking of the blocks on their pivots, and they would be liable to drag on the drum 4.

Attached to the opposite ends of the rocking shafts 9 are arms 16, having in their free ends ball sockets 17 adapted to receive the spherical tips 18 of thrust links 19. The thrust links 19 have their inner ends provided with a screw threaded hole 20 adapted to receive a screw threaded shank 21 of an eye 22, which is pivotally connected to lugs 23, 23 projecting radially from a collar 24 slidable on the shaft 3. The collar 24 is provided with a peripheral groove carrying a ring pivotally connected with a swinging shipper lever 25 in the usual manner in devices of this class. The eyes 22 are held from rotating by their pivotal connection with the lugs 23, but the thrust links 19 are hexagonal at their inner ends, as shown at 26, to receive a wrench by which they may be rotated on the screw threaded shanks 21, thereby enabling the link connections between the arms 16 and the sliding collar 24 to be lengthened to compensate for wear between the friction surfaces of the clutch. Each of the screw threaded shanks 21 is provided with a check nut 27 to lock the links from rotation.

In order to connect the shafts 2 and 3 by means of the clutching mechanism, the collar 24 is moved by the shipper lever in the direction of the arrow 28, Fig. 1. The link connections between the collar 24 and the arms 16 normally stand at an oblique angle to the line of the shafts, as represented in Fig. 1, so that when the collar 24 is moved in the direction of the arrow 28 the arms 16 will be crowded outwardly, thereby rocking the shafts 9 in the bearings of the frame 7 and drawing the blocks 12 inward toward the frictional periphery of the drum 4, thereby clamping the wooden facings against the surface of the drum. It is to be noted that the rocking of the shafts 9 in the manner above described causes movement of each of the blocks 12 in the direction of rotation of the driving member, which is indicated by the arrows 29, Figs. 2 and 3, thereby effecting the wrapping action of the blocks upon said member in the direction most advantageous to the effective engagement of the clutching surfaces. The frictional engagement of the wooden facings 13 with the drum will cause the rotary movement of the latter to be imparted to the blocks 12 and through the shafts 9 to the frame 7 and attached shaft 3. It will be obvious, however, that the conditions might be reversed and the shaft 3 be made the driving shaft whose rotary motion would be communicated in the same manner to the shaft 2.

The ball sockets 17 are made sufficiently large at their mouths to receive the spherical tips 18 of the links 19, which are then held from removal from the ball sockets by rings 29 of Babbitt metal cast in internal recesses in the ball sockets.

It is to be noted that in the movement of the collar 24 in the direction of the arrow 28, Fig. 1, the inclined links 19 impart to the arms 16 a gradually increasing thrust, as the said links are carried nearer and nearer to their vertical positions. The arrangement constitutes in effect a series of toggle joints, adapted to exert an increasing leverage on each block in the movement of the same into contact with the drum.

I claim:

1. In a friction clutch, a driving member and a driven member, one of said members comprising a series of shoes disposed in surrounding relation to the other member, and each of said shoes being pivotally supported at a point offset from its center, and means for constraining the opposing ends of adjacent shoes to move toward or from said other member in unison.

2. In a friction clutch, a driving member and a driven member, one of said members comprising a series of pivotally supported shoes disposed in surrounding relation to the other member, the opposing ends of said shoes being flexibly interlocked, and means for moving said shoes into frictional contact with said other member.

3. In a friction clutch, a driving member and a driven member, one of said members comprising a series of shoes, each of said shoes being pivotally supported at a point offset from its center, and having a flexible interlocking connection at each end with adjacent shoes of the series, and means for moving said shoes into frictional contact with the other member.

4. In a friction clutch, a driving member and a driven member, one of said members comprising a series of pivotally supported shoes adapted to be moved simultaneously into frictional contact with the other member, and means for constraining the opposing ends of said shoes to move toward or from said other member in unison.

Dated this ninth day of May, 1912.

NATHANIEL LOMBARD.

Witnesses:
PENELOPE COMBERBACH,
NELLIE WHALEN.